US012416882B2

(12) United States Patent
Taya et al.

(10) Patent No.: US 12,416,882 B2
(45) Date of Patent: Sep. 16, 2025

(54) SEMI ELECTRO-CONDUCTIVE FILM, ELECTROPHOTOGRAPHIC BELT, AND ELECTROPHOTOGRAPHIC IMAGE FORMING APPARATUS

(71) Applicant: CANON KABUSHIKI KAISHA, Tokyo (JP)

(72) Inventors: Akihiro Taya, Kanagawa (JP); Hidetaka Kawamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 635 days.

(21) Appl. No.: 17/831,694

(22) Filed: Jun. 3, 2022

(65) Prior Publication Data

US 2022/0397844 A1 Dec. 15, 2022

(30) Foreign Application Priority Data

Jun. 15, 2021 (JP) ................................. 2021-099261
May 30, 2022 (JP) ................................. 2022-087810

(51) Int. Cl.
*G03G 15/16* (2006.01)

(52) U.S. Cl.
CPC .................................. *G03G 15/162* (2013.01)

(58) Field of Classification Search
CPC .................................................... G03G 15/162
See application file for complete search history.

(56) References Cited

U.S. PATENT DOCUMENTS

| | | | | |
|---|---|---|---|---|
| 10,025,233 | B2 | 7/2018 | Yoshida | |
| 2002/0006573 | A1* | 1/2002 | Nakazawa | G03G 15/162 430/127 |
| 2012/0308272 | A1* | 12/2012 | Nakaegawa | G03G 15/1605 399/302 |
| 2015/0072148 | A1* | 3/2015 | Hayashi | G03G 15/1605 399/302 |
| 2016/0320726 | A1 | 11/2016 | Yoshida | |
| 2017/0242372 | A1 | 8/2017 | Omori et al. | |
| 2020/0379375 | A1* | 12/2020 | Koga | G03G 15/162 |

FOREIGN PATENT DOCUMENTS

| | | | |
|---|---|---|---|
| JP | 2004-281277 | A | 10/2004 |
| JP | 2012-133220 | A | 7/2012 |
| JP | 2015-055740 | A | 3/2015 |
| JP | 2016-212413 | A | 12/2016 |
| JP | 2017-146504 | A | 8/2017 |

* cited by examiner

*Primary Examiner* — Mark F. Huff
*Assistant Examiner* — Boone Alexander Evans
(74) *Attorney, Agent, or Firm* — Venable LLP

(57) ABSTRACT

Provided is a semi electro-conductive film comprising a binder resin and electroconductive particles. The volume resistivity of the electroconductive layer is $1\times10^9$ Ω·cm or more and $1\times10^{12}$ Ω·cm or less. The electroconductive layer has a first phase containing a first resin and a second phase containing a second resin. The electroconductive layer further includes electroconductive particles. The electroconductive particles are unevenly present in the second phase. The first resin is a crystalline resin. The second resin is a noncrystalline resin with a thermal decomposition temperature of 400° C. or more.

11 Claims, 3 Drawing Sheets

SEMI ELECTRO-CONDUCTIVE FILM, ELECTROPHOTOGRAPHIC BELT, AND ELECTROPHOTOGRAPHIC IMAGE FORMING APPARATUS

BACKGROUND

Technical Field

The present disclosure relates to a semi electro-conductive film usable as an intermediate transfer medium of an electrophotographic image forming apparatus, an electrophotographic belt, and an electrophotographic image forming apparatus.

Description of the Related Art

In recent years, various electrophotographic image forming apparatuses such as photocopiers, printers, and facsimiles that obtain high-quality color images have started to be marketed. Generally, to obtain a high-quality color image, firstly, toner images of a plurality of colors are individually developed and then transferred onto an intermediate transfer medium in turn at respective primary transfer portions to thereby form color images. This is followed by secondary transfer of the color images formed on the intermediate transfer medium onto a recording medium at once. In this way, a high-quality color image with only very small image misalignment is obtained.

As the intermediate transfer medium used in the above, a belt formed by melt extrusion of a resin composition containing a thermoplastic resin and carbon black dispersed therein has been proposed.

Thermoplastic resins, which can be melt-extruded, are superior to thermosetting resins in terms of environmental impact and cost, and have therefore been actively studied even at the present.

Such a circumstance has led to studies on utilization of super engineering plastics, among thermoplastic resins, that exhibit high performance as well as high mechanical strength, durability, and thermal resistance for electrophotographic image forming apparatuses, which are required to be fast and durable. Of those plastics, polyether ether ketone is excellent in properties such as wear resistance, chemical resistance, slidability, toughness, and flame resistance.

Japanese Patent Application Laid-Open No. 2012-133220 also discloses a durable intermediate transfer belt using polyether ether ketone.

Semiconductive belts using a polyether ether ketone resin are expected to be significantly excellent in mechanical strength, durability, thermal resistance, cost, and so on.

However, conventional semiconductive belts using a thermoplastic resin may cause a phenomenon of generating image defects such as a white void if images are repetitively output using a process of energizing and discharging the intermediate transfer media or the like.

In particular, if there is a gap between the inner peripheral surface of such an intermediate transfer medium and a primary transfer roller at a primary transfer portion, an electrical discharge occurs between a portion of the intermediate transfer medium where particles of an electroconductive filler have aggregated and the primary transfer roller. This locally lowers the electrical resistance of the intermediate transfer medium. At the portion with the lowered electrical resistance, no toner is transferred, thereby forming an image appearing in white (white void).

The phenomenon of lowering the electrical resistance of the intermediate transfer medium due to an electrical discharge as described above is remarkable particularly when the dispersibility of the electroconductive filler is low. Japanese Patent Application Laid-Open No. 2012-133220 discloses the following semi electro-conductive film for preventing the electrical resistance lowering phenomenon.

A semi electro-conductive film in which the density of particles of acetylene black as an electroconductive filler observed at a cross section of the semi electro-conductive film is 20 particles/$\mu m^2$ or more, and the average distance between the adjacent wall surfaces of the particles of the acetylene black is 120 nm or less.

Here, due to a demand for further lowering the cost of electrophotographic image forming apparatuses, the present inventors have considered replacing a semiconductive rubber roller being a metallic core with its periphery covered with a semiconductive rubber layer, which has conventionally been used as a primary transfer roller, with a metallic roller. However, in the case of using a metallic roller as the primary transfer roller, the value of the resistance of the primary transfer portion is determined solely by the intermediate transfer medium. Then, in order to stabilize the value of the current flowing through the primary transfer portion, the volume resistivity of the intermediate transfer medium needs not to change even by a long-term use. As a result of studies by the present inventors, it has been found that, to obtain such an intermediate transfer medium, it is effective to improve the dispersibility of the electroconductive filler in the electroconductive layer of the intermediate transfer medium within the binder.

However, as a result of further studies, it has been found that the volume resistivity of a semi electro-conductive film with an electroconductive filler highly dispersed in a binder may be changed by application of a high voltage over a long period of time.

SUMMARY

At least one aspect of the present disclosure is directed to providing a semi electro-conductive film whose volume resistivity is prevented from changing even by voltage application over a long period of time.

Moreover, another aspect of the present disclosure is directed to providing an electrophotographic belt whose volume resistivity is prevented from changing even by voltage application over a long period of time.

Furthermore, still another aspect of the present disclosure is directed to providing an electrophotographic image forming apparatus capable of stably forming high-quality electrophotographic images over a long period of time.

According to one aspect of the present disclosure, there is provided a semi electro-conductive film including a binder resin and electroconductive particles. The semi electroconductive film has a volume resistivity of $1\times10^9$ Ω·cm or more and $1\times10^{12}$ Ω·cm or less. The semi electroconductive film has a first phase containing a first resin and a second phase containing a second resin. The electroconductive particles are unevenly present in the second phase. Further the first resin is a crystalline resin, and the second resin is a non-crystalline resin with a thermal decomposition temperature of 400° C. or more.

Moreover, according to another aspect of the present disclosure, there is provided an electrophotographic belt having the above semi electro-conductive film.

Furthermore, according to still another aspect of the present disclosure, there is provided an electrophotographic image forming apparatus including an intermediate transfer medium using the above semi electro-conductive film.

Further features of the present disclosure will become apparent from the following description of exemplary embodiments with reference to the attached drawings.

DESCRIPTION OF THE EMBODIMENTS

An embodiment of the present disclosure will be described below with reference to the drawings. However, the scope of the present disclosure is not limited to this embodiment, and the present disclosure also encompasses modifications without departing from the gist of the present disclosure.

A semi electro-conductive film according to the present disclosure will be described below in more detail.

<1> Electrophotographic Image Forming Apparatus

First of all, an embodiment of an electrophotographic image forming apparatus using the semi electro-conductive film according to the present disclosure (hereinafter referred to also as "image forming apparatus") will be described.

Figure 1:
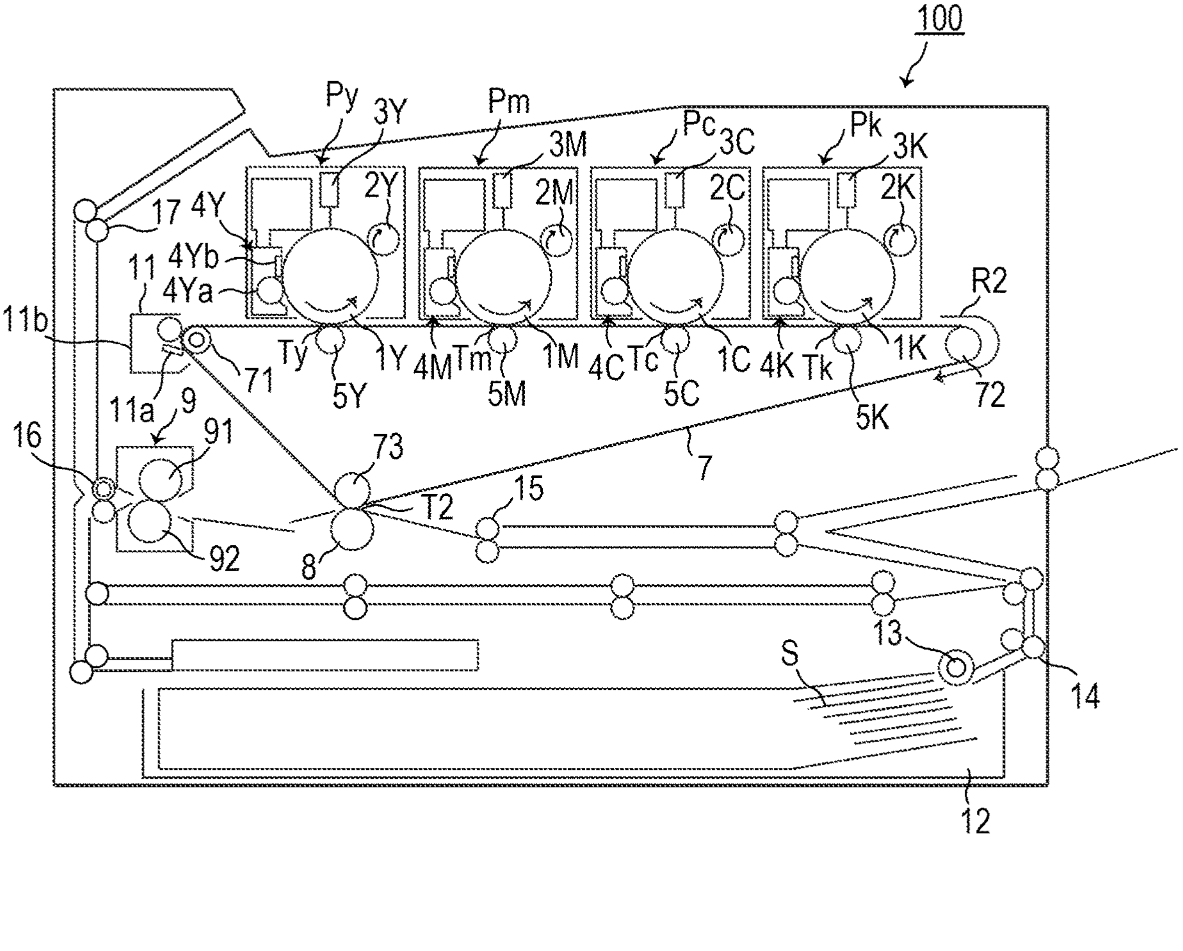
FIG. 1 is a schematic cross-sectional view of an electrophotographic image forming apparatus 100 in an embodiment.

FIG. 1 is a schematic cross-sectional view of an image forming apparatus 100 in the present embodiment. The image forming apparatus 100 in the present embodiment is a tandem color laser printer employing an intermediate transfer method which is capable of forming a full-color image by using an electrophotographic technique.

The image forming apparatus 100 has a plurality of image forming units, namely, first, second, third, and fourth image forming units PY, PM, PC, and PK. These first, second, third, and fourth image forming units PY, PM, PC, and PK are disposed in this order along the direction of movement of a horizontal portion (image transfer surface) of an intermediate transfer belt 7 to be described later. The elements of the first, second, third, and fourth image forming units PY, PM, PC, and PK having the same or corresponding functions or configurations may be collectively described by omitting Y, M, C, and K at the ends of their reference signs indicating the elements' colors. In the present embodiment, each image forming unit P includes a photosensitive drum 1, a charge roller 2, an exposure device 3, a development device 4, and a primary transfer roller 5 to be described later.

The image forming unit P has the photosensitive drum 1, which is a drum-shaped (cylindrical) photosensitive member (electrophotographic photosensitive member) as an image carrying member. The photosensitive drum 1 is formed by stacking a charge generation layer, a charge transportation layer, and a surface protection layer in this order on an aluminum cylinder serving as a base. The photosensitive drum 1 is rotationally driven in the direction of the arrow in FIG. 1 (counterclockwise direction). The surface of the rotating photosensitive drum 1 is uniformly charged at a predetermined potential of a predetermined polarity (negative polarity in the present embodiment) by the charge roller 2, which is a roller-shaped charging member serving as a charging unit. During the charging process, a predetermined charging bias (charging voltage) containing a negative DC component is applied to the charge roller 2. The charged surface of the photosensitive drum 1 is subjected to scanning exposure based on image information by the exposure device (laser scanner) 3 serving as an exposure unit, so that an electrostatic image (electrostatic latent image) is formed on the photosensitive drum 1.

The electrostatic image formed on the photosensitive drum 1 is developed (visualized) by being supplied with a toner serving as a developer by the development device 4 serving as a development unit, so that a toner image (developer image) is formed on the photosensitive drum 1. During the development process, a predetermined development bias (development voltage) containing a negative DC component is applied to a development roller 4*a* included as a developer carrying member in the development device 4. In the present embodiment, the toner, which is charged with the same polarity as the charge polarity of the photosensitive drum 1 (negative polarity in the present embodiment), gets attached to the exposed portion (image portion) of the photosensitive drum 1, at which the absolute value of the potential has been lowered by the exposure following the uniform charging.

The intermediate transfer belt 7, which is an endless belt serving as an intermediate transfer medium, is disposed to face the four photosensitive drums 1. The intermediate transfer belt 7 is a semi electro-conductive film and is wound around a drive roller 71, a tension roller 72, and a secondary transfer opposing roller 73 serving as a plurality of stretch rollers and stretched with a predetermined tension. As the drive roller 71 is rotationally driven, the intermediate transfer belt 7 rotates (revolves) in the direction of the arrow R2 in FIG. 1 (clockwise direction) in contact with each photosensitive drum 1. Each primary transfer roller 5, which is a roller-shaped primary transfer member serving as a primary transfer unit, is disposed on the inner peripheral surface side of the intermediate transfer belt 7 for the corresponding photosensitive drum 1.

The primary transfer roller 5 is pressed toward the photosensitive drum 1 with the intermediate transfer belt 7 therebetween to thereby form a primary transfer portion (primary transfer nip) T at which the photosensitive drum 1 and the intermediate transfer belt 7 contact each other. At the primary transfer portion T, the primary transfer roller 5 acts such that the toner image formed on the photosensitive drum 1 as described above is subjected to primary transfer onto the rotating intermediate transfer belt 7. During the primary transfer process, a primary transfer bias (primary transfer voltage), which is a DC voltage of the opposite polarity to the normal charge polarity of the toner (the charge polarity during the development process) (positive polarity in the present embodiment) is applied to the primary transfer roller 5. The primary transfer roller 5 is, for example, made of a metal, and the material is sulfur and sulfur composite free-cutting steel (SUM) or stainless steel (SUS). The primary transfer roller 5 may include a metallic rotary shaft and an elastic layer formed on the outer peripheral surface of the rotary shaft with the resistance adjusted to a desired value. In the case of using a metallic roller as the primary transfer roller 5, the surface of the metallic roller contacts the inner peripheral surface of the intermediate transfer belt 7. This makes the value of the current through the primary transfer portion greatly dependent on the volume resistivity of the intermediate transfer belt, as mentioned earlier. Then, to stabilize the transferability of toner images at the primary transfer portion over time, it is particularly important to prevent the volume resistivity of the intermediate transfer belt from changing. The semi electro-conductive film according to the present disclosure is particularly effective in such a case.

A secondary transfer roller 8, which is a roller-shaped secondary transfer member serving as a secondary transfer unit, is disposed at a position on the outer peripheral surface side of the intermediate transfer belt 7 opposite the secondary transfer opposing roller 73. The secondary transfer roller 8 is pressed toward the secondary transfer opposing roller 73 with the intermediate transfer belt 7 therebetween to thereby form a secondary transfer portion (secondary transfer nip) T2 at which the intermediate transfer belt 7 and the secondary transfer roller 8 contact each other. At the secondary transfer portion T2, the secondary transfer roller 8 acts such that each toner image formed on the intermediate transfer belt 7 as described above is subjected to secondary transfer onto a recording material (sheet, transfer material) such as a paper sheet held between and conveyed by the intermediate transfer belt 7 and the secondary transfer roller 8. During the secondary transfer process, a secondary transfer bias (secondary transfer voltage), which is a DC voltage of the opposite polarity to the normal charge polarity of the toner, is applied to the secondary transfer roller 8. During the secondary transfer, a transfer voltage of several kV is usually applied in order to ensure sufficient transfer efficiency. From a cassette 12 storing a recording material S, the recording material S is supplied into a conveyance path by a pick-up roller 13. The recording material S supplied into the conveyance path is conveyed to the secondary transfer portion T2 by a conveyance roller pair 14 and a registration roller pair 15 with the same timing as the toner image on the intermediate transfer belt 7.

After the toner image is transferred, the recording material S is conveyed to a fixing device 9 serving as a fixing unit. The fixing device 9 heats and presses the recording material S bearing the toner image, which has not yet been fixed, to thereby fix (melt and stick) the toner image onto the recording material S. The recording material S with the toner image fixed thereto is discharged (delivered) by a conveyance roller pair 16, a discharge roller pair 17, and the like to the outside of the main body of the image forming apparatus 100.

Each toner not transferred onto the intermediate transfer belt 7 in the primary transfer process and remaining on the surface of the corresponding photosensitive drum 1 (primary transfer residual toner) is collected by the corresponding development device 4, which serves also as a photosensitive member cleaning unit, simultaneously with the development. Also, each toner not transferred onto the recording material S in the secondary transfer process and remaining on the surface of the intermediate transfer belt 7 (secondary transfer residual toner) is removed and collected from the surface of the intermediate transfer belt 7 by a belt cleaning device 11 serving as an intermediate transfer medium cleaning unit. The belt cleaning device 11 is disposed downstream of the secondary transfer portion T2 but upstream of the most upstream primary transfer unit Ty in the direction of rotation of the intermediate transfer belt 7 (a position opposite the drive roller 71 in the present embodiment). The belt cleaning device 11 scrapes the secondary transfer residual toner off the surface of the rotating intermediate transfer belt 7 with a cleaning blade 11*a* serving as a cleaning member disposed in contact with the surface of the intermediate transfer belt 7, and stores the residual toner in a collection container 11*b*.

As described above, an image forming operation involves repeating a process of electrically transferring a toner image from each photosensitive drum 1 to the intermediate transfer belt 7 and from the intermediate transfer belt 7 to the recording material S. Moreover, this electrical transfer process is further repeated as image forming is repeated for many recording materials S.

<2> Electrophotographic Belt

An electrophotographic belt usable as the intermediate transfer belt 7 has at least a base layer (substrate). The usable electrophotographic belt may be a laminate having this base layer and a layer covering at least one of its surfaces. The form of such an electrophotographic belt may be, for example, an endless shape.

Figure 2A:
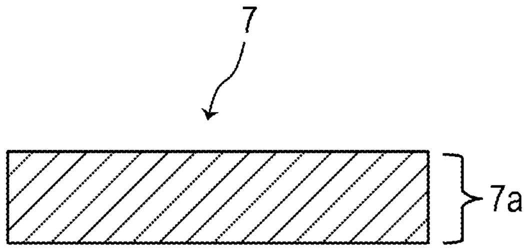
FIGS. 2A and 2B are schematic cross-sectional views for describing example layer configurations of an intermediate transfer belt 7.
Figure 2B:
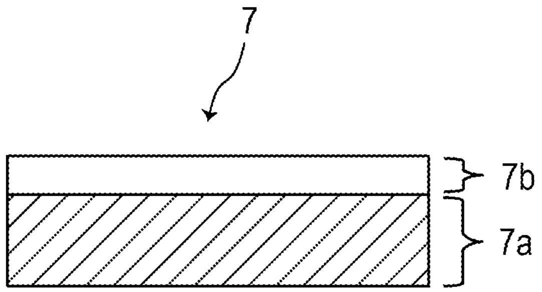

FIGS. 2A and 2B are schematic cross-sectional views for describing example layer configurations of the electrophotographic belt. As illustrated in FIG. 2A, the electrophotographic belt 7 may include a single layer 7*a* (the single layer may be referred to as "base layer" herein). Alternatively, as illustrated in FIG. 2B, the electrophotographic belt 7 may include at least two layers, namely, the base layer 7*a* and a surface layer 7*b* provided on the base layer 7*a*. Note that another layer may be provided such as an intermediate layer between the base layer 7*a* and the surface layer 7*b*, for example. As will be described below in detail, the base layer 7*a* is a semi electro-conductive film including a binder resin and electroconductive particles (hereinafter referred to also as "electroconductive filler") contained therein.

<3> Decrease in Volume Resistivity of Electrophotographic Belt

A binder resin with carbon black (hereinafter referred to also as "CB") as an example of the electroconductive filler dispersed therein may be shaped into the form of a sheet or an endless belt as a semi electro-conductive film. This semi electro-conductive film has a plurality of electrical conduction paths formed by CB particles coupled from the front surface to the back surface of the semi electro-conductive film. The electrical resistance of each of these electrical conduction paths includes the electrical resistance of the electrically conductive portion formed by CB particles and the electrical resistance of the contact resistance portion formed when CB particles are coupled.

In the case of using such a semi electro-conductive film as an intermediate transfer belt in a full-color electrophotographic image forming apparatus, for example, energization due to application of a high voltage to the semi electro-conductive film during image forming may results in load concentration and decrease the volume resistivity of the semi electro-conductive film over time. This decrease in volume resistivity is considered to be due to deterioration of the binder resin present between the CB particles in the electrical conduction paths. Specifically, the decrease in volume resistivity is considered to be due to the concentration of an electric field at the binder resin present between CB particles in response to the voltage application, which carbonizes this binder resin and thereby causes electric breakdown.

<4> Semi Electro-Conductive Film

A semi electro-conductive film according to an aspect of the present disclosure, for example, forms the base layer of an electrophotographic belt and has a volume resistivity of $1\times10^{9}$ Ω·cm or more and $1\times10^{12}$ Ω·cm or less.

Figure 3:
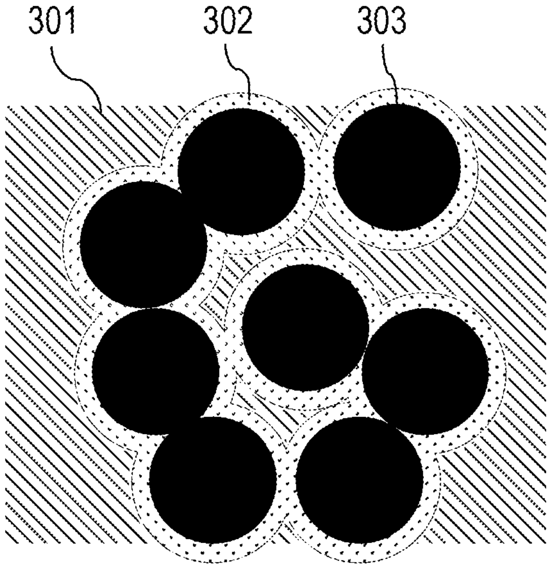
FIG. 3 is a schematic view of a semi electro-conductive film in the present disclosure.

FIG. 3 is a schematic view of the semi electro-conductive film in the present disclosure. The semi electro-conductive film includes at least a first phase 301 containing a crystalline first resin, a second phase 302 containing a noncrystalline second resin, and an electroconductive filler 303 unevenly present in the second phase.

The semi electro-conductive film according to an aspect of the present disclosure has a configuration in which the first resin includes therein the phase containing the second resin, and electroconductive particles are unevenly present in the phase containing the second resin. In such a configuration, the second resin is considered to be interposed between particles of the electroconductive filler forming electrical conduction paths. Here, in the case where the second resin is a noncrystalline resin, it is possible to prevent the volume resistivity of the semi electro-conductive film from being change even by voltage application to the semi electro-conductive film over a long period of time. While it is not clear why such an advantageous effect can be achieved by using a noncrystalline resin as the second resin, there is a tendency that a resin with lower crystallinity has higher permittivity. It is considered that, when the second resin interposed between individual particles of the electroconductive filler in the electrical conduction paths is a noncrystalline resin, the electric field between the particles of the electroconductive filler is small, thereby reducing partial discharge between the particles of the electroconductive filler. Thus, it is considered possible to suppress a decrease in the volume resistivity of the semi electro-conductive film even if voltage is applied to the semi electro-conductive film over a long period of time.

<First Resin>

As the constituent resin material of the first resin serving as the binder resin of the semi-electroconductive film according to one aspect of the present disclosure, crystalline thermoplastic resins such as polyphenylene sulfide (PPS) and polyether ether ketone (PEEK) are usable.

Polyether ether ketone (PEEK) is particularly preferable since the intermediate transfer belt is required to be able to withstand a long-term tensile load without stretching and withstand rubbing of the cleaning blade without the surface being worn. Moreover, two or more resins may be selected and a mixture thereof may be used as necessary.

<Second Resin>

As the constituent resin material of the second resin, various noncrystalline resins are usable. In particular, a resin with a thermal decomposition temperature of 400° C. or more is used since the second resin may be subjected to a high temperature above 400° C. when kneaded with the first resin in the process of manufacturing the semi electro-conductive film to be described later.

<Thermal Decomposition Temperature>

The thermal decomposition temperature can be derived by thermogravimetry (TG). TG is a method that measures the mass of a sample as a temperature or time function while changing or holding the temperature of the sample in accordance with a certain program. The thermal decomposition temperature of a sample is defined herein as the temperature at the point when the mass of the sample has decreased by 2% as a result of heating the sample under an air atmosphere at a rate of temperature rise of 10° C./min from room temperature. As the apparatus for the thermogravimetry, a differential simultaneous thermogravimetric analyzer STA7200 manufactured by Hitachi High-Tech Corporation or the like is usable, for example.

Moreover, examples of the resin with a thermal decomposition temperature of 400° C. or more include polyethersulfone (PES), polysulfone (PSU), polyetherimide (PEI), polyphenylsulfone (PPSU), modified polyphenylene ether (m-PPE), and polyamide imide (PAI). One of these resins may be used alone, or a mixture of two or more may be used.

<Content of Second Resin>

The content of the second resin, which is needed to be filled between particles of the electroconductive filler to suppress partial discharge, is preferably 4% by mass or more and 28% by mass or less and more preferably 9% by mass or more and 18% by mass or less relative to the content of the electroconductive filler. If the content of the second resin is excessively large, it lowers the mechanical strength of the first resin and the wear resistance of the surface. If the content is excessively small, the partial discharge cannot be suppressed.

<Electroconductive Filler>

The electroconductive filler is electroconductive fine particles such as carbon black or fine particles of a metal. Of these, carbon black is preferable for its ability to impart excellent mechanical properties. Carbon black has various names depending on its manufacturing method and raw material. Specifically, these include ketjen black, furnace black, acetylene black, thermal black, gas black, and the like.

As the carbon black, various publicly known kinds are usable. Specifically, these include ketjen black, furnace black, acetylene black, thermal black, gas black, and the like. Of these, acetylene black and furnace black are preferable, which contain only few impurities, are unlikely to have foreign matter defects when shaped into a film form together with the above-mentioned thermoplastic resin, and are easy to obtain desired electrical conductivity. Specific examples of the acetylene black include the following: "DENKA BLACK" series (manufactured by Denka Company Limited), "MITSUBISHI Conductive Filler" series (manufactured by Mitsubishi Chemical Corporation), "VULCAN" series (manufactured by Cabot Corporation), "PRINTEX" series (manufactured by Degussa), and "SRF" (manufactured by Asahi Carbon Co., Ltd.). Specific examples of the furnace black include the following: "TOKABLACK" series (manufactured by TOKAI CARBON CO., LTD.), "Asahi Carbon Black" series (manufactured by Asahi Carbon Co., Ltd.), and "Niteron" series (manufactured by NIPPON STEEL Carbon Co., Ltd.).

<Content of Electroconductive Filler>

The content of the electroconductive filler relative to the content of the first resin, the second resin, and the electroconductive filler (electroconductive particles) is selected by taking into account whether the electroconductive filler can impart necessary electrical conductivity to the semi electro-conductive film as well as the semi electro-conductive film's mechanical strengths of the such as flex resistance and elastic modulus and thermal conductivity. If the content of the electroconductive filler is excessively large, it lowers the mechanical strength. The content is therefore 25.0% by mass or less and preferably 24.0% by mass or less. On the other hand, if the content is excessively small, it may excessively lower the electrical conductivity of the semi electro-conductive film and make it difficult to maintain the electroconductive filler in a well dispersed state in the intermediate transfer belt. For this reason, the content of the electroconductive filler is 20.0% by mass or more and preferably 21.0% by mass or more.

<Number Average Particle Size of Primary Particles of Electroconductive Filler>

The number average particle size of primary particles of the electroconductive filler to be added (hereinafter referred to also as "average primary particle size") is preferably 10 nm or more and 30 nm or less. With the average primary particle size set at 10 nm or more, it is possible to suppress reaggregation of the filler. Also, with the average primary particle size set at 30 nm or less, it is possible to suppress a decrease in dispersibility and prevent a decrease in the resistance of the intermediate transfer medium due to discharge.

<5> Process of Manufacturing Semi Electro-Conductive Film

A semi electro-conductive film according to an aspect of the present disclosure can be manufactured by, for example, a method including the following steps (i) to (iii).

(i) Pre-processing step of mixing the second resin and the electroconductive filler to thereby obtain a surface-treated electroconductive filler being the electroconductive filler with its surface covered with the second resin.

(ii) Mixing step of mixing the first resin and the surface-treated electroconductive filler obtained in the pre-processing step in an environment at a temperature higher than or equal to the glass transition temperature of the first resin to thereby obtain a mixture.

(iii) Shaping step of melting the mixture obtained in the mixing step at a temperature higher than or equal to the melting temperature of the resin material and shaping the melted mixture into a cylindrical tubular form.

The above steps (i) to (iii) will now be described.

<Step (i) (Pre-Processing Step)>

In the pre-processing step, the second resin and the electroconductive filler are mixed to thereby obtain a surface-treated electroconductive filler being the electroconductive filler with its surface covered with the second resin. Firstly, the second resin is dissolved in a solvent. Generally, noncrystalline resins dissolve in organic solvents such as N-methyl-2-pyrrolidone and N,N-dimethylformamide. Some precursors of resins are water soluble, in which case their aqueous solutions are usable. Next, the electroconductive filler is mixed into the solution of the second resin such that the content of the second resin is preferably 4% by mass or more and 28% by mass or less and more preferably 9% by mass or more and 18% by mass or less relative to the content of the electroconductive filler, as mentioned earlier. The electroconductive filler is sufficiently dispersed in the mixture solution by using a dispersing machine, followed by removal of the solvent and drying. As the dispersing machine, various publicly known machines are usable. Specifically, a paint shaker, a bead mill, a high-pressure jet dispersing machine, an ultrasonic dispersing machine, and the like are usable. Of these, it is preferable to use a paint shaker for its ability to achieve excellent dispersion efficiency. The duration of processing by the dispersing machine, the amount to be processed by the dispersing machine, and the like need to be selected as appropriate according to the material.

The method of removing the solvent is not limited to drying by heating and includes flocculation of the resin using an acid or alkali followed by filtration. In the case of using the precursor of the resin, a process of curing the resin is performed after the removal of the solvent and the drying. The resultant powder is ground with a mortar or the like. As a result, the surface-treated electroconductive filler is obtained.

<Step (ii) (Mixing Step)>

In the mixing step, the first resin material and the surface-treated electroconductive filler obtained in the pre-processing step are mixed in an environment at a temperature higher than or equal to the glass transition temperature of the first resin material to thereby obtain a mixture. As the mixer used in the mixing step, a twin-screw kneader including two screws inside a barrel or cylinder is usable. After being supplied from a supply port in a supply unit, the mixture is moved forward toward a die by rotation of the screws while at the same time undergoing shear heating by the friction between the barrel or cylinder and screws and the raw materials, so that the raw materials get melted and mixed. At this time, if the temperature inside the barrel or cylinder becomes excessively high, the resin material thermally decomposes or thermally deteriorates. For this reason, the temperature of the raw materials needs to be controlled not to be excessively high by performing external cooling and/or temperature adjustment of the barrel or cylinder, adjustment of the rotational speed of the screws, and/or the like. If, on the other hand, the temperature inside the barrel or cylinder becomes excessively low, the resin material will not form a stably melted state, thereby making the dispersed state of the electroconductive filler non-uniform. This makes it difficult to obtain a mixture with excellent mechanical, electrical and optical properties. Usually, the twin-screw kneader is equipped with a strand die at its tip, through which the mixture is extruded into the form of bars, which are air-cooled and then cut to thereby prepare a mixture in the form of pellets.

Note that the mixing step may be preceded by a mixing step of mixing the first resin and the surface-treated electroconductive filler with a fluidizing mixer in an environment at a temperature lower than the glass transition temperature of the first resin material. As the fluidizing mixer, various publicly known mixers having a mechanism that utilizes fluidizing motion of solid bodies to perform mixing are usable. Specifically, mixers such as a Henschel mixer, a ribbon mixer, and a planetary mixer are usable. Of these, it is preferable to use a Henschel mixer for its excellent mixing efficiency. The number of rotations of the fluidizing mixer, the duration of processing by the fluidizing mixer, the amount to be processed by the fluidizing mixer, and the like need to be selected as appropriate according to the material.

<Step (iii) (Shaping Step)>

In the shaping step, the mixture obtained in the mixing step is shaped into the form of a cylindrical tubular belt. For the shaping, a method such as an extrusion method or an inflation method can be selected according to the resin to be used. It is preferable to use a cylinder extrusion method for its excellent productivity.

As the extruder for the extrusion method, a single-screw extruder including a single screw inside a barrel or cylinder and a multi-screw extruder including a combination of two or more screws inside a barrel or cylinder are usable. After being supplied from a supply port in a supply unit, the above-mentioned mixture in the form of pellets is moved forward toward a die by rotation of the screw(s) while at the same time being subject to a thermal energy from the barrel or cylinder and a mechanical energy from the screw(s), thereby being melted substantially completely, and supplied in a fixed amount to the tip of the extruder. The extruder is equipped with a cylindrical die at its tip, through which the melted mixture is extruded downward and pulled from below. As a result, the mixture is shaped into a cylindrical tube form.

Note that the thickness of the base layer of the intermediate transfer medium including one or more or more layers is, but not limited to, usually about 10 to 500 μm and typically about 50 to 200 μm.

<6> Method of Checking Arrangement of First and Second Resins and Electroconductive Filler By observing the formed semi electro-conductive film with a scanning electron microscope while heating the semi electro-conductive film, it is possible to check the arrangement of the first and second resins and the electroconductive filler. Specifically, it is possible to check whether the electroconductive particles are unevenly present in the second phase, whether electroconductive particles are in direct contact with each other, whether electroconductive particles are in contact with each other with the second resin therebetween, and so on.

Firstly, the semi electro-conductive film is cut with a utility knife or the like into a rectangular piece measuring about 10 mm×10 mm, which is then embedded in an epoxy resin. The epoxy resin is cured, and then a cross section sample is prepared with abrasive paper. Moreover, ion milling is performed on the sectional portion such that a step is provided between the first and second resin portion and the electroconductive filler portion. As the apparatus for the ion milling, IM4000 (manufactured by Hitachi, Ltd.) is usable, for example.

Next, the sectional portion is observed with a scanning electron microscope equipped with a jig capable of heating the sectional portion. ADURO (manufactured by Protochips Incorporated.) is usable as the jig capable of heating a sample, and JSM-7100F (manufactured by JEOL Ltd.) is usable as the scanning electron microscope, for example. At room temperature, the arrangement of the electroconductive filler can be checked. As the temperature is gradually raised, the second resin starts to deform by melting at around approximately 400° C. This makes it possible to check the arrangement of the second resin.

According to an aspect of the present disclosure, it is possible to provide a semi electro-conductive film usable for an intermediate transfer medium capable of suppressing formation of a white void image and maintaining stable electrical properties over a long period of use. Moreover, according to another aspect of the present disclosure, it is possible to provide an electrophotographic image forming apparatus capable of stably outputting high-quality electrophotographic images.

EXAMPLES

Example 1

<Pre-Processing Step>

4 g of polyethersulfone (PES) manufactured by Mitsui Chemicals, Inc. (E1010) was dissolved as the second resin in 74 g of N,N-dimethylformamide (DMF), and 22 g of carbon black (product number: #44, manufactured by Mitsubishi Chemical Corporation) was added as the electroconductive filler. Moreover, 30 g of 1 mm glass beads was added, and the resultant mixture was tightly contained and shaken for 10 hours with a paint shaker (manufactured by Toyo Seiki Seisaku-sho, Ltd.). Thereafter, the glass beads were filtered out with a 0.2 mm aperture mesh, and the filtered liquid was transferred into an aluminum container and heated to a temperature of 200° C. to evaporate the solvent. The powder remaining in the aluminum container was collected and ground with a mortar. As a result, a surface-treated electroconductive filler was obtained.

<Mixing Step>

The following materials were mixed and kneaded with a micro compounder (manufactured by Thermo Fisher Scientific K.K.), which was a twin-screw kneader with a set temperature of 380° C., and extruded into the form of bars, which were air-cooled and then cut to thereby prepare a mixture in the form of pellets.

26 g of the surface-treated electroconductive filler (electroconductive filler: 22 g, polyethersulfone: 4 g)

74 g of polyether ether ketone (PEEK) manufactured by Victrex plc. (450G) as the first resin.

<Shaping Step>

In order to shape the mixture obtained in the mixing step into the form of a cylindrical tubular belt, shaping using an extrusion method was performed. As a result, an 80 μm thick semi electro-conductive film was obtained.

<Observation with Scanning Electron Microscope>

From an observation with a scanning electron microscope, it was confirmed that the electroconductive layer had a first phase containing the first resin and a second phase containing the second resin and that the electroconductive particles were unevenly present in the second phase.

<Evaluation of Volume Resistivity>

The following annular probe and the following measurement stage were connected to the following resistivity measurement apparatus.

Then, the prepared semi electro-conductive film was sandwiched between the probe and the measurement stage, and the volume resistivity was measured by applying a voltage of 10 V between the probe's inner electrode (main electrode) and the measurement stage while applying a pressure of approximately 2 kg.

Resistivity measurement apparatus (product name: Hiresta-UP, manufactured by Mitsubishi Chemical Corporation)

Annular probe (product name: URS Probe, manufactured by Mitsubishi Chemical Corporation, the outer diameter of the inner electrode: 5.9 mm, the inner diameter of the outer electrode: 11.0 mm, the outer diameter of the outer electrode: 17.8 mm)

Measurement stage (product name: Resitable UFL, manufactured by Mitsubishi Chemical Corporation)

The volume resistivity was ranked based on the following evaluation criteria.

A: The volume resistivity is $1\times10^{10}$ Ω·cm or more and $1\times10^{11}$ Ω·cm or less.

B: The volume resistivity is $1\times10^{9}$ Ω·cm or more and less than $1\times10^{10}$ Ω·cm, or more than $1\times10^{11}$ Ω·cm and $1\times10^{12}$ Ω·cm or less.

C: The volume resistivity is less than $1\times10^{9}$ Ω·cm or more than $1\times10^{12}$ Ω·cm.

<Evaluation of Resistance Decrease>

Using the prepared semi electro-conductive film in an electrophotographic image forming apparatus having the configuration illustrated in FIG. 1 (product name: S-4800, manufactured by Hitachi High-Technologies Corporation), a durability test was carried in which 600,000 sheets of A3 normal paper (CS068, manufactured by Canon Inc.) were fed continuously in a low-humidity environment (temperature: 23° C., relative humidity: 5%). In the durability test, energization and paper feed were repeated without forming an image. The volume resistivity of the semi electro-conductive film after the end of the test was derived by using the above volume resistivity evaluation method, and the difference from the volume resistivity before the start of the test was checked and ranked based on the following evaluation criteria.

A: The volume resistivity after the end of the test is 0.8 times the volume resistivity before the start of the test or more.

B: The volume resistivity after the end of the test is 0.6 times the volume resistivity before the start of the test or more and less than 0.8 times.

C: The volume resistivity after the end of the test is less than 0.6 times the volume resistivity before the start of the test.

<Evaluation of Mechanical Strength>

Using a tensile tester, the prepared semi electro-conductive film's Young's modulus and upper yield stress were measured and ranked based on the following evaluation criteria.

A: The upper yield stress is 40 MPa or more and the Young's modulus is 1000 MPa or more.

B: The upper yield stress is 20 MPa or more and less than 40 MPa and the Young's modulus is 500 MPa or more, or the upper yield stress is 20 MPa or more and the Young's modulus is 500 MPa or more and less than 1000 MPa.

C: The upper yield stress is less than 20 MPa and/or the Young's modulus is less than 500 MPa.

Example 2

A semi electro-conductive film was prepared in a similar manner to Example 1 except that the carbon black was changed to "TOKABLACK #7550" (product name, manufactured by TOKAI CARBON CO., LTD.), and evaluated.

Example 3

The amount of the second resin and the amount of N,N-dimethylformamide in the pre-processing step were changed to 2.2 g and 75.8 g, respectively, and the amount of the surface-treated electroconductive filler and the amount of polyether ether ketone in the mixing step were changed to 24.2 g and 75.8 g, respectively. Besides the above, a semi electro-conductive film was prepared in a similar manner to Example 1 and evaluated.

Example 4

The amount of the second resin and the amount of N,N-dimethylformamide in the pre-processing step were changed to 1.1 g and 76.9 g, respectively, and the amount of the surface-treated electroconductive filler and the amount of polyether ether ketone in the mixing step were changed to 23.1 g and 76.9 g, respectively. Besides the above, a semi electro-conductive film was prepared in a similar manner to Example 1 and evaluated.

Example 5

The amount of the second resin and the amount of N,N-dimethylformamide in the pre-processing step were changed to 6.0 g and 72.0 g, respectively, and the amount of the surface-treated electroconductive filler and the amount of polyether ether ketone in the mixing step were changed to 28.0 g and 72.0 g, respectively. Besides the above, a semi electro-conductive film was prepared in a similar manner to Example 1 and evaluated.

Example 6

A semi electro-conductive film was prepared in a similar manner to Example 1 except that the second resin was changed to polysulfone (PSU) manufactured by Solvay S.A. (P-1700), and evaluated.

Example 7

In Example 7, a semi electro-conductive film was prepared in a similar manner to Example 1 except that the second resin was changed to polyetherimide (PEI) manufactured by Mitsubishi Chemical Advanced Chemicals Ltd. (Duratron U-1000), and evaluated.

Example 8

In Example 8, a semi electro-conductive film was prepared in a similar manner to Example 1 except that the second resin was changed to polyphenylsulfone (PPSU) manufactured by BASF SE (P-3010), and evaluated.

Example 9

In Example 9, a semi electro-conductive film was prepared in a similar manner to Example 1 except that the second resin was changed to modified polyphenylene ether (m-PPE) manufactured by Asahi Kasei Chemicals Corporation (XYRON S201A), and evaluated.

Example 10

<Pre-Processing Step>

15.7 g of a water-soluble polyamide imide precursor (product name: HPC-1000, manufactured by Showa Denko Materials Co., Ltd., solid content: 28%) (solid content: 4.4 g) was dissolved as the raw material of the second resin in 62.3 g of water. Moreover, 22 g of carbon black (product name: #44, manufactured by Mitsubishi Chemical Corporation) was added. Furthermore, 30 g of 1 mm diameter glass beads was added, and the resultant mixture was tightly contained and shaken for 10 hours with a paint shaker (manufactured by Toyo Seiki Seisaku-sho, Ltd.). Thereafter, the glass beads were filtered out with a 0.2 mm aperture mesh, and 1 mol/L of hydrochloric acid was added to the resultant liquid until no precipitation occurred, followed by flocculation. The solid content obtained by filtration was sufficiently dried and crashed with a mortar. As a result, a surface-treated electroconductive filler was obtained.

<Mixing Step>

26.4 g of the surface-treated electroconductive filler and 73.6 g of polyether ether ketone as the first resin were mixed and kneaded with a micro compounder (manufactured by Thermo Fisher Scientific K.K.), which was a twin-screw kneader with a set temperature of 380° C., and extruded into the form of bars. The bars were air-cooled and then cut to thereby prepare a mixture in the form of pellets.

<Shaping Step>

A semi electro-conductive film was prepared in a similar manner to the shaping step in Example 1 except that this mixture was used, and evaluated.

Example 11

The amount of the second resin and the amount of water in the pre-processing step were changed to 7.1 g and 70.9 g, respectively, and the amount of the surface-treated electroconductive filler and the amount of polyether ether ketone in the mixing step were changed to 24.0 g and 76.0 g, respectively. Besides the above, a semi electro-conductive film was prepared in a similar manner to Example 10 and evaluated.

Example 12

The amount of the second resin and the amount of water in the pre-processing step were changed to 3.6 g and 74.4 g, respectively, and the amount of the surface-treated electroconductive filler and the amount of polyether ether ketone in the mixing step were changed to 23.0 g and 77.0 g, respectively. Besides the above, a semi electro-conductive film was prepared in a similar manner to Example 10 and evaluated.

Example 13

The amount of the second resin and the amount of water in the pre-processing step were changed to 21.4 g and 56.6 g, respectively, and the amount of the surface-treated electroconductive filler and the amount of polyether ether ketone in the mixing step were changed to 28.0 g and 72.0 g, respectively. Besides the above, a semi electro-conductive film was prepared in a similar manner to Example 10 and evaluated.

Example 14

The amount of the second resin, the amount of the electroconductive filler, and the amount of N,N-dimethylformamide in the pre-processing step were changed to 4.0 g, 20.0 g and 76.0 g, respectively, and the amount of the surface-treated electroconductive filler and the amount of polyether ether ketone in the mixing step were changed to 24.0 g and 76.0 g, respectively. Besides the above, a semi electro-conductive film was prepared in a similar manner to Example 1 and evaluated.

Example 15

The amount of the second resin, the amount of the electroconductive filler, and the amount of N,N-dimethylformamide in the pre-processing step were changed to 4.0 g, 24.0 g and 72.0 g, respectively, and the amount of the surface-treated electroconductive filler and the amount of polyether ether ketone in the mixing step were changed to 28.0 g and 72.0 g, respectively. Besides the above, a semi electro-conductive film was prepared in a similar manner to Example 1 and evaluated.

Example 16

A semi electro-conductive film was prepared in a similar manner to Example 1 except that the first resin in the mixing step was changed to polyphenylene sulfide (PPS) manufactured by SK chemicals (ECOTRAN), and evaluated.

Comparative Example 1

As the electroconductive filler, carbon black without surface treatment (product name: #44, manufactured by Mitsubishi Chemical Corporation) was prepared. A mixture was prepared in the form of pellets in a similar manner to the mixing step in Example 1 except that 22.0 g of this carbon black and 78.0 g of polyether ether ketone were used. A semi electro-conductive film was prepared in a similar manner to the shaping step in Example 1 except that this mixture was used, and evaluated.

Comparative Example 2

A surface-treated electroconductive filler was prepared in a similar manner to the pre-processing step in Example 1. A mixture was prepared in the form of pellets in a similar manner to Comparative Example 1 except that the amount of this surface-treated electroconductive filler and the amount of polyether ether ketone were changed to 18.0 g and 82.0 g, respectively. A semi electro-conductive film was prepared in a similar manner to the shaping step in Example 1 except that this mixture was used, and evaluated.

Comparative Example 3

A mixture was prepared in the form of pellets in a similar manner to Comparative Example 1 except that the amount of the carbon black without surface treatment and the amount of polyether ether ketone were changed to 26.0 g and 74.0 g, respectively. A semi electro-conductive film was prepared in a similar manner to Example 1 except that this mixture was used, and evaluated.

Comparative Example 4

As the electroconductive filler, carbon black without surface treatment (product name: #44, manufactured by Mitsubishi Chemical Corporation) was prepared. A mixture was prepared in the form of pellets in a similar manner to the mixing step in Example 1 except that 22.0 g of this carbon black, 74.0 g of polyether ether ketone, and 4.0 g of polyethersulfone (PES) were used. A semi electro-conductive film was prepared in a similar manner to Example 1 except that the obtained mixture was used, and evaluated.

Comparative Example 5

<Pre-Processing Step>

6.0 g of polyphenylene sulfide (PPS), which was a crystalline resin, and 22.0 g of carbon black (product name: #44, manufactured by Mitsubishi Chemical Corporation) were mixed with a micro compounder (manufactured by Thermo Fisher Scientific K.K.), which was a twin-screw kneader with a set temperature of 380° C. The obtained mixture was crushed into a powder form with a portable crusher (product name: OML-1, manufactured by OSAKA CHEMICAL Co., Ltd.). As a result, a surface-treated electroconductive filler.

<Mixing Step>

A mixture was prepared in the form of pellets in a similar manner to the mixing step in Example 1 except that 28.0 g of the above obtained surface-treated electroconductive filler and 72.0 g of polyether ether ketone as the first resin were used. A semi electro-conductive film was prepared in a similar manner to Example 1 except that this mixture was used, and evaluated.

Comparative Example 6

A surface-treated electroconductive filler was prepared in a similar manner to the pre-processing step in Example 1 except that polycarbonate (PC) manufactured by the Mitsubishi Gas Chemical Company, Inc. (Iupizeta PCZ-200) was used as the second resin. A mixture was prepared in the form of pellets in a similar manner to Example 1 except that this surface-treated electroconductive filler was used. The mixture thus obtained was porous and brittle. This mixture was used in an attempt to form a semi electro-conductive film in a similar manner to the shaping step in Example 1, but a semi electro-conductive film could not be obtained.

The conditions for preparing the semi electro-conductive films in the examples and comparative examples are shown in Table 1, and their observation results and evaluation results are shown in Table 2.

TABLE 1

| | First Resin | | Electroconductive Filler | | Second Resin | | | | |
|---|---|---|---|---|---|---|---|---|---|
| | Kind | Amount (% by Mass) | Kind | Amount (% by Mass) | Kind | Thermal Decomposition Temperature (° C.) | Amount (% by Mass) | Ratio of Second Resin Relative to Electroconductive Filler | Dispersion Solvent |
| Example 1 | PEEK | 74.0 | #44 | 22.0 | PES | 480 | 4.0 | 18.2 | DMF |
| Example 2 | PEEK | 74.0 | #7550 | 22.0 | PES | 480 | 4.0 | 18.2 | DMF |
| Example 3 | PEEK | 75.8 | #44 | 22.0 | PES | 480 | 2.2 | 10.0 | DMF |
| Example 4 | PEEK | 76.9 | #44 | 22.0 | PES | 480 | 1.1 | 5.0 | DMF |
| Example 5 | PEEK | 72.0 | #44 | 22.0 | PES | 480 | 6.0 | 27.3 | DMF |
| Example 6 | PEEK | 74.0 | #44 | 22.0 | PSU | 472 | 4.0 | 18.2 | DMF |
| Example 7 | PEEK | 74.0 | #44 | 22.0 | PEI | 510 | 4.0 | 18.2 | DMF |
| Example 8 | PEEK | 74.0 | #44 | 22.0 | PPSU | 474 | 4.0 | 18.2 | DMF |
| Example 9 | PEEK | 74.0 | #44 | 22.0 | m-PPE | 402 | 4.0 | 18.2 | DMF |
| Example 10 | PEEK | 73.6 | #44 | 22.0 | PAI | 460 | 4.4 | 20.0 | Water |
| Example 11 | PEEK | 76.0 | #44 | 22.0 | PAI | 460 | 2.0 | 9.1 | Water |
| Example 12 | PEEK | 77.0 | #44 | 22.0 | PAI | 460 | 1.0 | 4.5 | Water |
| Example 13 | PEEK | 72.0 | #44 | 22.0 | PAI | 460 | 6.0 | 27.3 | Water |
| Example 14 | PEEK | 76.0 | #44 | 20.0 | PES | 480 | 4.0 | 20.0 | DMF |
| Example 15 | PEEK | 72.0 | #44 | 24.0 | PES | 480 | 4.0 | 16.7 | DMF |
| Example 16 | PPS | 74.0 | #44 | 22.0 | PES | 480 | 4.0 | 18.2 | DMF |
| Comparative Example 1 | PEEK | 78.0 | #44 | 22.0 | N.A. | — | — | — | — |
| Comparative Example 2 | PEEK | 82.0 | #44 | 18.0 | N.A. | — | — | — | — |
| Comparative Example 3 | PEEK | 74.0 | #44 | 26.0 | N.A. | — | — | — | — |
| Comparative Example 4 | PEEK | 74.0 | #44 | 22.0 | PES | 480 | 4.0 | 18.2 | — |
| Comparative Example 5 | PEEK | 72.0 | #44 | 22.0 | PPS | 487 | 6.0 | 27.3 | — |
| Comparative Example 6 | PEEK | 74.0 | #44 | 22.0 | PC | 380 | 4.0 | 18.2 | DMF |

TABLE 2

| | Result of Observation with SEM | | Volume Resistivity | | Resistance Decrease | | Mechanical Strengths | | |
|---|---|---|---|---|---|---|---|---|---|
| | Having First and Second Phases? | Electroconductive Filler Is Unevenly Present in Second Phase? | Log (Ω · cm) | Rank | Difference between Volume Resistivities before and after Test | Rank | Upper Yield Stress (MPa) | Young's Modulus | Rank |
| Example 1 | Yes | Yes | 10.1 | A | 0.95 | A | 55 | 1120 | A |
| Example 2 | Yes | Yes | 10 | A | 0.94 | A | 65 | 1630 | A |
| Example 3 | Yes | Yes | 10.1 | A | 0.92 | A | 58 | 1420 | A |
| Example 4 | Yes | Yes | 10.2 | A | 0.72 | B | 57 | 1180 | A |
| Example 5 | Yes | Yes | 10.2 | A | 0.96 | A | 52 | 980 | B |
| Example 6 | Yes | Yes | 10.4 | A | 0.88 | A | 62 | 1700 | A |
| Example 7 | Yes | Yes | 10.2 | A | 0.89 | A | 55 | 1550 | A |
| Example 8 | Yes | Yes | 10 | A | 0.82 | A | 54 | 1620 | A |
| Example 9 | Yes | Yes | 10.2 | A | 0.9 | A | 48 | 1480 | A |
| Example 10 | Yes | Yes | 10.2 | A | 0.88 | A | 55 | 1210 | A |
| Example 11 | Yes | Yes | 10.1 | A | 0.89 | A | 65 | 1150 | A |
| Example 12 | Yes | Yes | 10.1 | A | 0.77 | B | 50 | 1050 | A |
| Example 13 | Yes | Yes | 10.2 | A | 0.91 | A | 45 | 950 | B |
| Example 14 | Yes | Yes | 11.8 | B | 0.88 | A | 50 | 1750 | A |
| Example 15 | Yes | Yes | 9.1 | B | 0.82 | A | 55 | 1120 | A |
| Example 16 | Yes | Yes | 10 | A | 0.81 | A | 55 | 1650 | A |
| Comparative Example 1 | No | — | 10 | A | 0.55 | C | 52 | 1600 | A |
| Comparative Example 2 | No | — | 12.2 | C | 0.45 | C | 51 | 1650 | A |
| Comparative Example 3 | No | — | 6.5 | C | 0.48 | C | 55 | 1350 | A |
| Comparative Example 4 | Yes | No | 10.1 | A | 0.47 | C | 58 | 1420 | A |
| Comparative Example 5 | Yes | No | 10.2 | A | 0.45 | C | 40 | 1050 | A |

TABLE 2-continued

| | Result of Observation with SEM | | Volume Resistivity | | Resistance Decrease | | Mechanical Strengths | | |
|---|---|---|---|---|---|---|---|---|---|
| | Having First and Second Phases? | Electroconductive Filler Is Unevenly Present in Second Phase? | Log (Ω · cm) | Rank | Difference between Volume Resistivities before and after Test | Rank | Upper Yield Stress (MPa) | Young's Modulus | Rank |
| Comparative Example 6 | Yes | Yes | | — | | — | | | — |

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-099261, filed Jun. 15, 2021, and Japanese Patent Application No. 2022-087810, filed May 30, 2022, which are hereby incorporated by reference herein in their entirety.

What is claimed is:

1. A semi electro-conductive film, comprising:
a binder resin; and
electroconductive particles;
the semi electro-conductive film having a first phase containing a crystalline first resin, and a second phase containing a noncrystalline second resin having a thermal decomposition temperature of 400° C. or more; and
the electroconductive particles being unevenly present in the second phase, wherein
a content of the second resin is 4 to 28% by mass relative to a content of the electroconductive particles,
a content of the electroconductive particles is 20.0 to 25.0% by mass relative to a total content of the first resin, the second resin and the electroconductive particles, and
the semi electro-conductive film has a volume resistivity of $1\times10^9$ to $1\times10^{12}$ Ω·Cm.

2. The semi electro-conductive film according to claim 1, wherein the electroconductive particles unevenly present in the second phase directly contact each other.

3. The semi electro-conductive film according to claim 1, wherein a content of the electroconductive particles is 21.0 to 24.0% by mass relative to the total content of the first resin, the second resin and the electroconductive particles.

4. The semi electro-conductive film according to claim 1, wherein the noncrystalline resin is a member selected from the group consisting of polyethersulfone, polysulfone, polyetherimide, polyphenylsulfone, modified polyphenylene ether, and polyamide imide.

5. The semi electro-conductive film according to claim 1, wherein the content of the second resin is 9 to 18% by mass relative to the content of the electroconductive particles.

6. The semi electro-conductive film according to claim 1, wherein the crystalline resin is polyether ether ketone or polyphenylene sulfide.

7. An electrophotographic belt, comprising:
a semi electro-conductive film as a base layer;
the semi electro-conductive film comprising a binder resin and electroconductive particles;
the semi electro-conductive film having a first phase containing a crystalline first resin, and a second phase containing a noncrystalline second resin having a thermal decomposition temperature of 400° C. or more; and
the electroconductive particles being unevenly present in the second phase, wherein
a content of the second resin is 4 to 28% by mass relative to a content of the electroconductive particles,
a content of the electroconductive particles is 20.0 to 25.0% by mass relative to a total content of the first resin, the second resin and the electroconductive particles, and
the semi electro-conductive film has a volume resistivity of $1\times10^9$ to $1\times10^{12}$ Ω·cm.

8. An electrophotographic image forming apparatus, comprising:
an intermediate transfer medium, the intermediate transfer medium comprising a semi electro-conductive film,
the semi electro-conductive film comprising a binder resin and electroconductive particles;
the semi electro-conductive film having a first phase containing a crystalline first resin, and a second phase containing a noncrystalline second resin having a thermal decomposition temperature of 400° C. or more; and
the electroconductive particles being unevenly present in the second phase, wherein
a content of the second resin is 4 to 28% by mass relative to a content of the electroconductive particles,
a content of the electroconductive particles is 20.0 to 25.0% by mass relative to a total content of the first resin, the second resin and the electroconductive particles, and
the semi electro-conductive film has a volume resistivity of $1\times10^9$ to $1\times10^{12}$ Ω·cm.

9. The electrophotographic image forming apparatus according to claim 8, wherein the intermediate transfer medium is an electrophotographic belt having an endless shape and comprises the semi electro-conductive film as a base layer.

10. The electrophotographic image forming apparatus according to claim 9, further comprising a primary transfer roller in contact with an inner peripheral surface of the electrophotographic belt, wherein
the primary transfer roller is a metallic roller.

11. The semi electro-conductive film according to claim 1, wherein the electroconductive particles unevenly present in the second phase contact each other with the second resin interposed therebetween.

* * * * *